ELECTRO-OPTICAL COUNTER CIRCUIT
Filed May 19, 1961
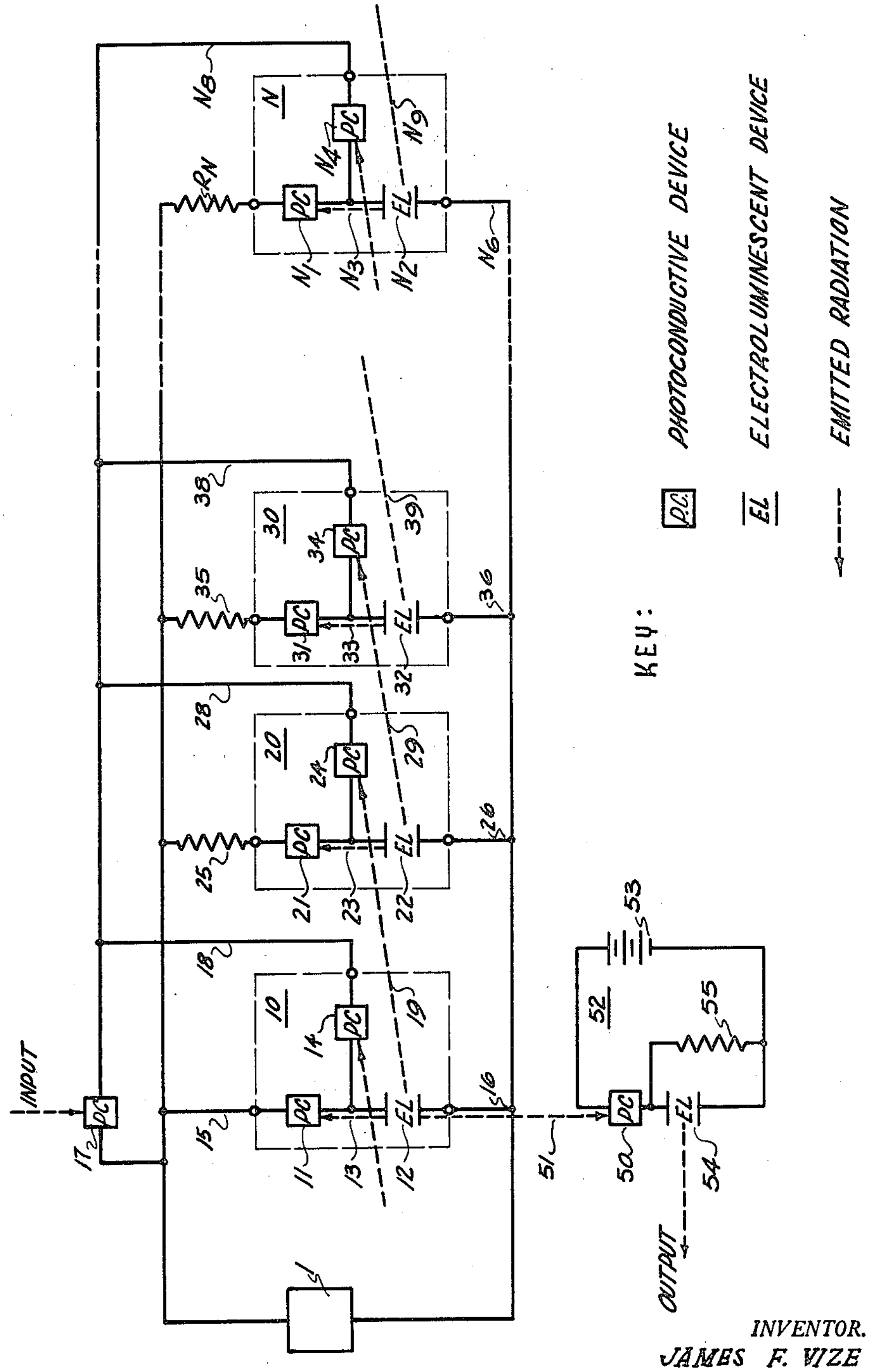
INVENTOR.
JAMES F. VIZE
BY
William C. Cahill United States Patent Office 3,167,657

Patented Jan. 26, 1965

3,167,657
ELECTRO-OPTICAL COUNTER CIRCUIT

James F. Vize, Palo Alto, Calif., assignor to General Electric Company, a corporation of New York Filed May 19, 1961, Ser. No. 111,271
9 Claims. (Cl. 250—208)

The present invention relates to counter circuits, and more particularly, to counter circuits utilizing photoconductive and electroluminescent devices.

Electroluminescent devices are presently well known in the art, and may be defined generally as devices utilizing laminar solid-state materials which will emit radiation when an electrical field or potential is applied to opposing laminations. These electroluminescent devices may be designed to emit radiation of selected wave lengths, and generally exhibit an increase in brightness as the applied potential is increased.

Photoconductive devices are those devices in which the conductivity varies as a function of the incident radiation and may be designed to be receptive to selected radiation wave lengths. Accordingly, a photoconductive device designed to be receptive to a given wave length radiation, and an electroluminescent device designed to emit radiation of the same wave length may be connected in electrical series to form what is usually referred to as an electro-optical pair. The radiation emitted by the electroluminescent device of the electro-optical pair is directed onto the photoconductive device thereby providing a feedback means which may be conveniently used to "lock" the pair in a given state of conduction. Such electro-optical pairs generally exhibit two states of stable operation, the first of which is a relatively high current, high emitted radiation, and low resistance state, and second of which is a low current, low emitted radiation, and high resistance state.

In the second of the two states mentioned above, the low-current state, the electroluminescent device is in a state of low emitted radiation, and the radiation thereby directed to the photoconductive device is insufficient to change the conductivity thereof to a high conductivity value. The electro-optical pair therefore exhibits a high resistance and consequently restricts the flow of current to a relatively low value. If an external source of radiation is directed onto the photoconductive device, the device exhibits a change of conductivity to a higher value, the amount of current drawn by the electro-optical pair will increase; subsequently, the increased current through the electroluminescent device will increase the radiation; the increased radiation falling on the corresponding photoconductive device will further increase its conductivity, and the electro-optical pair will draw still further current. If the external auxiliary source of radiation is now removed from the photoconductive device, sufficient radiation will be emitted from the electroluminescent device to maintain the high conductivity value of the photoconductive device. The circuit is thus "switched" from a low to a high conductivity state.

Electro-optical pairs of the type described may be arranged and inter-connected to form a counter. A counter is a device having a plurality of bistable or switching elements connected so that only one of the elements is in a given stable state at one time. The signals to be counted are applied simultaneously to all the elements of the counter to change the state of the element in the given state, and cause another element to assume the given state. Counters utilizing electro-optical pairs for bistable elements have many advantages such as, increased reliability, low cost, and the visual representation of the contents of the counter.

Accordingly, it is the primary object of the present invention to provide a counter circuit utilizing photoconductive and electroluminescent devices.

It is a further object of the present invention to provide an electro-optical counter circuit having improved operating characteristics.

It is still another object of the present invention to provide a more efficient and economical counter circuit utilizing photoconductive and electroluminescent devices.

Further objects and advantages of the present invention will become apparent to those skilled in the art as the description thereof proceeds.

Briefly stated, in accordance with one aspect of the present invention, a counter circuit is provided having a plurality of photoconductive devices and electroluminescent cells arranged in electro-optical pairs. Each of the electro-optical pairs is provided with an additional photoconductive device which may be utilized to precondition the particular pair for conduction. The counter circuit is also provided with a photoconductive device which is responsive to radiation from an external source and which triggers the counter circuit to "count," thereby yielding an indication of the number of radiation pulses received. An output circuit is arranged to yield a single light pulse of predetermined amplitude and duration each time a selected electro-optical pair changes from one state of operation to another.

The invention, both as to its organization and operation together with further objects and advantages thereof, may best be understood by reference to the following description taken in connection with the accompanying drawing which shows a counter circuit constructed in accordance with the teachings of the invention.

Referring to the drawing, a constant current source 1 supplies a plurality of stages indicated generally at 10, 20, 30 . . . N. The stage 10 forms a three terminal circuit including a photoconductive device 11 in series with an electroluminescent device 12. The photoconductive device and the electroluminescent device form an electro-optical pair which, when in the high conductivity state, will maintain the low resistance value of the photoconductive device by the radiation feedback from the electroluminescent device 12; this radiation feedback is indicated generally by the broken line 13. The stage 10 is also provided with a second or "switching" photoconductive device 14 which is connected to the junction between the photoconductive device 11 and electroluminescent device 12. The stage 10 is joined to the constant current source 1 through conductors 15 and 16 and is connected to an input photoconductive device 17 through conductor 18. The electroluminescent device 12 directs radiation to the photoconductive device 11 as indicated by the broken line 13, and also directs radiation to the succeeding stage as indicated by the broken line 19.

The remaining stages are similar to stage 10, and the corresponding elements of the succeeding stages are numbered accordingly, that is, the electro-optical pair of stage 20 is numbered 21 and 22, the electro-optical pair of stage 30 is numbered 31 and 32, etc. The stages, 20, 30 . . . N are connected to the constant current source 1 and input photoconductive device 17 in a manner similar to the first stage 10 with one exception, that is, a resistance, 25, 35 . . . $R_n$ is inserted between the respective photoconductive device of the electro-optical pair and the constant current source 1. The function of the inserted resistance 25, 35 . . . $R_n$ is to insure the high conductivity state of only the first stage when the counter is first turned on. Alternatively, the resistors may be eliminated by choosing photoconductive device 11 having a lower resistance than photoconductive devices 21, 31 . . . $N_1$ when not illuminated. The radiation from the electroluminescent device of the final stage N is directed toward the photoconductive device of the electro-optical pair of the final stage, and is also directed toward the switching photoconductive device 14 of the first stage 10. Thus, a complete counter is formed, and the switching of the final stage N to the high conductivity state will precondition the first stage 10.

The radiation emitted by the electroluminescent device 12 of stage 10 is also directed to a photoconductive device 50 as indicated by the broken line 51. The photoconductive device 50 is included in an output circuit indicated generally at 52. The output circuit 52 includes a direct current potential source 53 connected in series with photoconductive device 50 and an electroluminescent device 54. The electroluminescent device 54 is provided with a shunting resistor 55, and the radiation emitted from the electroluminescent device 54 may be directed to the input of a second counter circuit similar to the one shown.

The operation of the circuit shown in the drawing may be described as follows. The constant current source 1 provides sufficient current for the high conductivity operation of only one of the stages of the counter circuit; thus, only one of the stages may be in the high conductivity state at a given time. Assuming that the counter circuit is initially off, and that it is desired to start the counter by causing the first stage 10 to assume the high conductivity state, a resistance 25, 35 . . . $R_n$ is included in series with each of the stages with exception of stage 10. The constant current source 1 may be replaced by a constant voltage source in series with a large resistance. Because of the high resistance of each of the stages when the counter circuit is first turned on, the constant current source must be capable of rising to a very high voltage until the first stage begins conducting. During this high voltage period, there may be a danger of injury to some of the components. Accordingly a constant voltage source, having a chosen safe voltage, may provide the necessary starting voltage, and will appear as a constant current source during normal operation if the resistance placed in series therewith is large relative to the counter circuit resistance during operation. The first stage 10 thus presents the lowest resistance to the flow of current, and stage 10 will thus be selected when the counter is first turned on. Current then flows through conductor 15, photoconductive device 11, to electroluminescent device 12. The electroluminescent device 12 emits radiation which is directed to the photoconductive device 11, thereby reducing the resistance of the element 11 and "locking in" the stage 10 in its high conductivity state. The radiation from electroluminescent device 12 is also directed to the output circuit 52, and photoconductive device 24 of the succeeding stage 20.

The starting procedure may be altered by providing a manual push-button or momentarily-closing relay in parallel with photoconductive device 11 to temporarily increase the conductivity of stage 10 and thus permit electroluminescent device 12 to "lock" stage 10 in the high conductivity state. Alternatively, a source of radiation, temporarily energized when energizing the counter circuit, may be positioned to radiate upon photoconductive device 11 and thereby increase its conductivity to permit stage 10 to assume the high conductivity state. The utilization of either of these alternate starting techniques obviates the necessity of resistors 25, 35 . . . $R_n$. The radiation from device 12 falling upon switching photoconductive device 24, indicated by the broken line 19, causes the resistance of device 24 to lower. When a pulse of light is received by the photoconductive device 17, thereby reducing its resistance, the current flowing from the constant current source flows through the device 17, through the device 24 to electroluminescent device 22. The reduced value of resistances of devices 17 and 24 provides a lower resistance path to the flow of current from the constant current source 1 than the previously existing current path through device 11 and electroluminescent device 12.

As the flow of current through electroluminescent device 22 increases, the emitted radiation from that particular device increases, and the radiation directed upon photoconductive device 21 decreases its resistance increasing the current flowing through the electro-optical pair comprising devices 21 and 22. Since the constant current source 1 can supply sufficient current to support only one stage in its high conductivity state, the current flowing through the first stage 10 decreases. The decreasing current through the first stage 10 reduces the radiation emitted by the electroluminescent device 12, thus increasing the resistance of photoconductive device 11, and further reducing the current flowing through the first stage 10. Consequently, first stage 10 is switched to its low conductivity state, and the second stage 20 is switched to its high conductivity stage. To insure reliable switching, photoconductive device 17 in series with photoconductive device 14, 24, or 34 should have a higher conductivity than photoconductive device 11, 21, or 31 when illuminated.

When a second input pulse of light is received by the photoconductive device 17, a similar switching of conductivity of stages 20 and 30 occurs, and stage 20 is switched to its low conductivity state while stage 30 is switched to its high conductivity state. It may be seen that as each stage is locked in by the interaction of the electroluminescent device and series-connected photoconductive device of the respective stage, each succeeding stage is preconditioned by the radiation directed on its switching photoconductive device from the preceding stage. Therefore, when a pulse of light is received by the photoconductive device 17, a relatively low resistance current path is provided through the element 17 and the switching photoconductive device of the preconditioned stage. The relatively low resistance current path enables the electroluminescent device of the preconditioned stage to increase its radiation and, through the radiation coupling with the series-connected photoconductive device of the electro-optical pair, reduce the resistance of the current path through that particular stage. As a result of the increased current flowing through the preconditioned stage, the current flowing through the preceding stage is reduced, and the subsequent increase in resistance in the electro-optical pair of the preceding stage causes a regenerative action which switches the high conductivity state from the preceding stage to the preconditioned stage.

When the light pulse from the photoconductive device 17 is removed, current flows from the constant current source to the high conductivity stage, and through the electroluminescent device of that stage. Since the radiation emitted from that particular device is directed on the switching photoconductor of the succeeding stage, the succeeding stage is thus preconditioned and the counter circuit is ready for the next incoming light pulse. The circuit may be made relatively insensitive to extraneous signals, thereby insuring stability when switching is not supposed to occur, by choosing switching photoconductive devices 14, 24, 34 . . . $N_4$ having a lower conductivity when not illuminated than photoconductive devices 11, 21, 31 . . . $N_1$.

The described circuit may be utilized to supply an additional circuit similar to that shown in the drawing by coupling the radiation emitted from the first stage 10 to the input of the second counter circuit. However, since the electroluminescent device 12 of the first stage 10 may radiate for varying lengths of time, depending upon the time stage 10 remains in the high conductivity state, the radiation emitted by the electroluminescent device 12 will not be of a definite time length. For example, the first stage 10 may remain in the high conductivity state for a relatively great length of time during which the succeeding counter is being energized by radiation from electroluminescent device 12. Excessive energizing time may cause the counter to "skip." That is, when radiation impinges on photoconductive device 17, and establishes a new current path through the preconditioned stage, excessive duration of the impinging radiation may cause the succeeding stage after the preconditioned stage to become "preconditioned" and begin conducting thereby "skipping" a stage. Consequently, the output of the counter described thus far will not be suited to the direct input to a photoconductive device of a succeeding counter. Accordingly, an output circuit 52 is provided. The radiation from electroluminescent device 12 is directed on a photoconductive device 50 of the output circuit 52. The electroluminescent device 54 of the output circuit 52 is an A.C. electroluminescent cell which will emit radiation when a voltage having a rate of change is impressed across the cell. Thus, in the quiescent state, no radiation is emitted from the device 54. When light is emitted from the electroluminescent device 12 of the stage 10, the resistance of the photoconductive device 50 decreases rapidly, and the transient current produced by the rapid change in resistance causes electroluminescent device 54 to radiate. Since the electroluminescent device 54 is an A.C. electroluminescent cell having characteristics similar to a capacitor, the device will emit light for a time determined by the time required for device 54 to charge to the impressed D.C. value. To prevent an additional light pulse from being emitted by the electroluminescent device 54 when the photoconductive device 50 suddenly returns to its high resistance value, a shunting resistor 55 is provided across the device 54. Consequently, when the light from electroluminescent device 12 of stage 10 is cut off, and the resistance of photoconductive element 50 of output circuit 52 suddenly increases, the charge stored on the electroluminescent device 54 discharges through the resistor 55 for a time determined by the RC time constant of the parallel circuit 54–55. Thus, if the resistance 55 is sufficiently high, the gradual discharge of the electroluminescent device 54 will prevent it from emitting radiation, and the output circuit 52 will provide a single pulse of light, having a predetermined duration, each time the electro-optical pair comprising devices 11 and 12 is switched to its high conductivity state.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. A counter circuit comprising, a constant current source, a plurality of more than two stages each having a photoconductive device and an electroluminescent device in series to form an electro-optical pair, each of said electro-optical pairs electrically connected to said constant current source in parallel with the electro-optical pair of each of the other of said stages, each of said electro-optical pairs having a high conductivity state and a low conductivity state, said constant current source capable of supplying sufficient current to maintain only one of said electro-optical pairs in the high conductivity state, means for shunting the photoconductive device in one of said electro-optical pairs while said one electro-optical pair is in the low conductivity state, said means comprising a photoconductive device responsive to radiation from the electroluminescent device of one of said electro-optical pairs in the high conductivity state.

2. A counter circuit comprising, a constant current source, a plurality of stages each having a photoconductive device and an electroluminescent device in series to form an electro-optical pair, each of said electro-optical pairs electrically connected to said constant current source in parallel with the electro-optical pair of each of the other of said stages, each of said electro-optical pairs having a high conductivity state and a low conductivity state, means for shunting the photoconductive device in a selected one of said electro-optical pairs, said means comprising a photoconductive device responsive to radiation from the electroluminescent device of another of said electro-optical pairs, and means providing a single output radiation pulse of predetermined duration whenever a selected electro-optical device is switched from one of said states of conductivity to the other of said states of conductivity.

3. A counter circuit comprising, a constant current source, a plurality of stages each having a photoconductive device and an electroluminescent device in series to form an electro-optical pair, each of said electro-optical pairs electrically connected to said constant current source in parallel with the electro-optical pair of each of the other of said stages, each of said electro-optical pairs having a high conductivity state and a low conductivity state, means for shunting the photoconductive device in one of said electro-optical pairs while said one electro-optical pair is in the low conductivity state, said means comprising a photoconductive device responsive to radiation from the electroluminescent device of one of said electro-optical pairs in the high conductivity state, and means providing a single output radiation pulse of predetermined duration whenever a selected optical pair is switched from one of said states of conductivity to the other of said states of conductivity.

4. A counter circuit comprising, a constant current source, a plurality of more than two stages each having a photoconductive device and an electroluminescent device in series to form an electro-optical pair, each of said electro-optical pairs electrically connected to said constant current source in parallel with the electro-optical pair of each of the other of said stages, each of said electro-optical pairs having a high conductivity state and a low conductivity state, said constant current source capable of supplying sufficient current to maintain only one of said electro-optical pairs in the high conductivity state, means for shunting the photoconductive device in one of said electro-optical pairs while said one electro-optical pair is in the low conductivity state, said means comprising a photoconductive device responsive to radiation from the electroluminescent device of one of said electro-optical pairs in the high conductivity state, and means providing a single output radiation pulse of predetermined duration whenever a selected electro-optical pair is switched from one of said states of conductivity to the other of said states of conductivity.

5. A counter circuit comprising, a constant current source, a plurality of stages each having a photoconductive device and an electroluminescent device in series to form an electro-optical pair, each of said electro-optical pairs electrically connected to said constant current source in parallel with the electro-optical pair of each of the other of said stages, each of said electro-optical pairs having a high conductivity state and a low conductivity state, means for shunting the photoconductive device in a selected one of said electro-optical pairs, said means comprising a photoconductive device responsive to the radiation from the electroluminescent device of one of said electro-optical pairs in the high conductivity state, means providing a single output radiation pulse of predetermined duration whenever a selected electro-optical pair is switched from one of said states of conductivity to the other of said states of conductivity, said last-mentioned means comprising, a photoconductive device arranged to receive radiation by an electroluminescent device of one of said electro-optical pairs, an electroluminescent device in electrical series with said photoconductive device, a source of potential applied to said series connected devices, and a resistor connected in electrical parallel to said electroluminescent device.

6. A counter circuit comprising, a constant current source having a first and a second terminal, an input photoconductive device having a first and a second terminal, means electrically connecting said first terminal of said input photoconductive device to said first terminal of said constant current source, a plurality of more than two stages each having three terminals and including a first photoconductive device and an electroluminescent device connected in electrical series between the first and second terminals of said stage to form an electro-optical pair, each stage also including a second photoconductive device electrically connected to the third terminal of said stage and to the junction between said series connected devices, each of said stages having a high conductivity state and a low conductivity state, said constant current source capable of supplying sufficient current to maintain only one of said stages in the high conductivity state, said electroluminescent device of each stage adapted to radiate upon the first photoconductive device of said stage and upon the second photoconductive device of another of said stages, means electrically connecting the first and second terminals of each of said stages to said first and second terminals of said constant current source, and means electrically connecting the third terminal of each of said stages to the second terminal of said input photoconductive device.

7. A counter circuit comprising, a constant current source having a first and a second terminal, an input photoconductive device having a first and a second terminal, means electrically connecting said first terminal of said input photoconductive device to said first terminal of said constant current source, a plurality of stages each having three terminals and including a first photoconductive device and an electroluminescent device connected in electrical series between the first and second terminals of said stage to form an electro-optical pair, each stage also including a second photoconductive device electrically connected to the third terminal of said stage and to the junction between said series-connected devices, each of said stages having a high conductivity state and a low conductivity state, said electroluminescent device of each stage adapted to radiate upon the first photoconductive device of said stage and upon the second photoconductive device of another of said stages, means electrically connecting the first and second terminals of each of said stages to said first and second terminals of said constant current source respectively, means electrically connecting the third terminal of each of said stages to the second terminal of said input photoconductive device, and means providing a single output radiation pulse of predetermined duration whenever a selected stage is switched from one of said states of conductivity to the other of said states of conductivity.

8. A counter circuit comprising, a constant current source having a first and a second terminal, an input photoconductive device having a first and a second terminal, means electrically connecting said first terminal of said input photoconductive device to said first terminal of said constant current source, a plurality of more than two stages each having three terminals and including a first photoconductive device and an electroluminescent device connected in electrical series between the first and second terminals of said stage to form an electro-optical pair, each stage also including a second photoconductive device electrically connected to the third terminal of said stage and to the junction between said series-connected devices, each of said stages having a high conductivity state and a low conductivity state, said constant current source capable of supplying sufficient current to maintain only one of said stages in the high conductivity state, said electroluminescent device of each stage adapted to radiate upon the first photoconductive device of said stage and upon the second photoconductive device of another of said stages, means electrically connecting the first and second terminals of each of said stages to said first and second terminals of said constant current source respectively, means electrically connecting the third terminal of each of said stages to the second terminal of said input photoconductive device, and means providing a single output radiation pulse of predetermined duration whenever a selected stage is switched from one of said states of conductivity to the other of said states of conductivity.

9. A counter circuit comprising, a constant current source having a first and a second terminal, an input photoconductive device having a first and a second terminal, means electrically connecting said first terminal of said input photoconductive device to said first terminal of said constant current source, a plurality of more than two stages each having three terminals and including a first photoconductive device and an electroluminescent device connected in electrical series between the first and second terminals of said stage to form an electro-optical pair, each stage also including a second photoconductive device electrically connected to the third terminal of said stage and to the junction between said series connected devices, each of said stages having a high conductivity state and a low conductivity state, said constant current source capable of supplying sufficient current to maintain only one of said stages in the high conductivity state, said electroluminescent device of each stage adapted to radiate upon the first photoconductive device of said stage and upon the second photoconductive device of another of said stages, means electrically connecting the first and second terminals of each of said stages to said first and second terminals of said constant current source respectively, means electrically connecting the third terminal of each of said stages to the second terminal of said input photoconductive device, and means providing a single output radiation pulse of predetermined duration whenever a selected stage is switched from one of said stages of conductivity to the other of said states of conductivity, said last mentioned means comprising, a photoconductive device arranged to receive radiation from an electroluminescent device of one of said electro-optical pairs, an electroluminescent device in electrical series with said photoconductive device, a source of potential applied to said series connected devices, and a resistor connected in electrical parallel to said electroluminescent device.

References Cited by the Examiner

UNITED STATES PATENTS

| | | | |
|---|---|---|---|
| 2,895,054 | 7/59 | Loebner. | |
| 2,900,522 | 8/59 | Reis | 250—208 |
| 2,900,574 | 8/59 | Kazan. | |
| 2,907,001 | 9/59 | Loebner. | |
| 2,984,749 | 5/61 | Ross | 250—209 |
| 2,988,645 | 6/61 | Wilmotte. | |
| 3,038,081 | 6/62 | Montemurro | 250—208 X |
| 3,040,178 | 6/62 | Lyman et al. | |
| 3,042,807 | 7/62 | Vize | 250—208 X |
| 3,066,223 | 11/62 | Vize | 250—208 |
| 3,112,403 | 11/63 | Blank | 250—208 |

RALPH G. NILSON, *Primary Examiner.*

ARCHIE R. BORCHELT, *Examiner.*